Patented June 19, 1923.

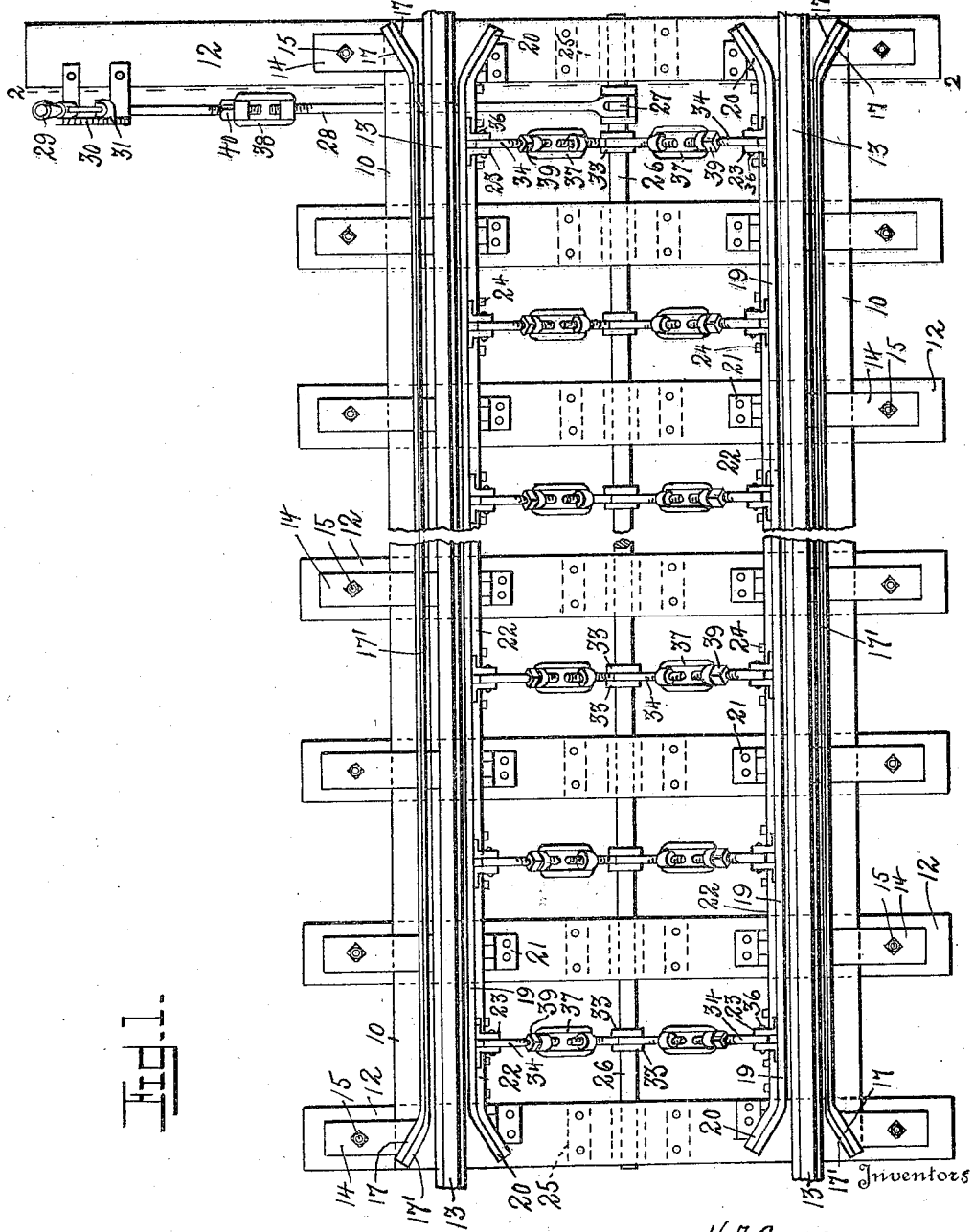

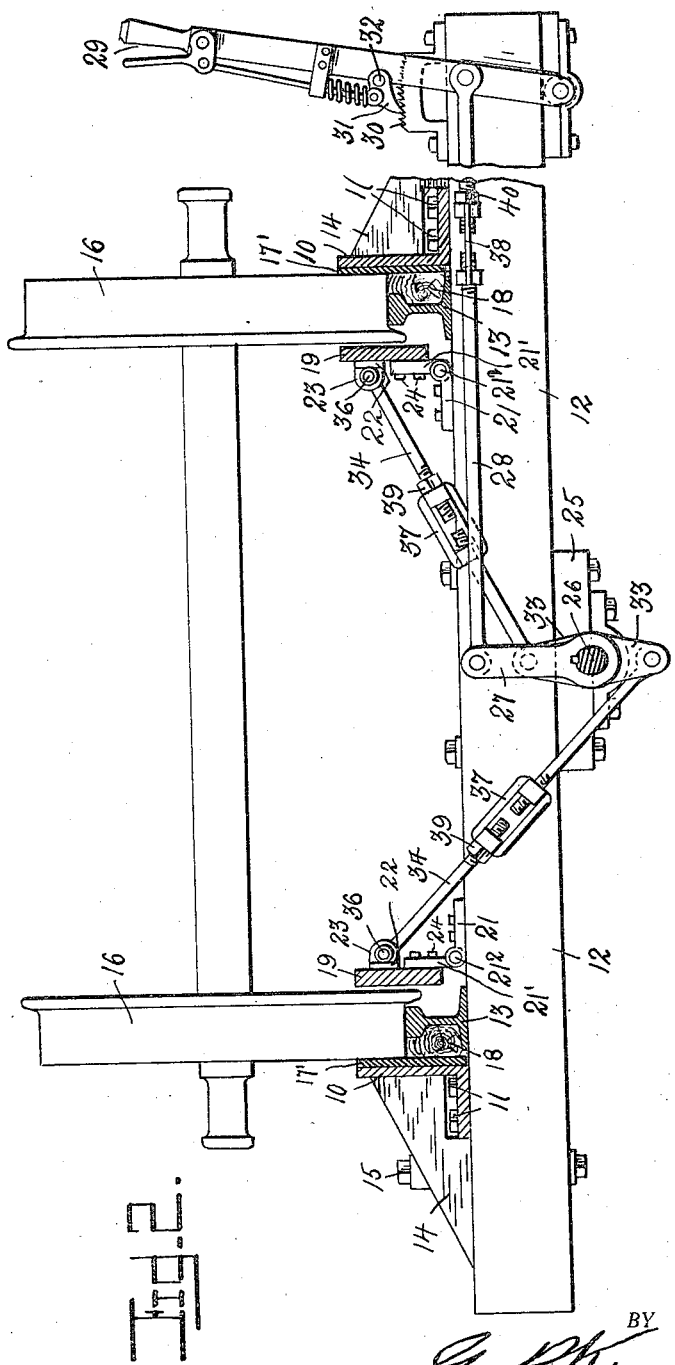

1,459,574

UNITED STATES PATENT OFFICE.

HARRY A. COVER AND ALBERT McKINNEY, OF MOUNT VERNON, ILLINOIS.

BRAKE DEVICE.

Application filed October 5, 1920. Serial No. 414,944.

*To all whom it may concern:*

Be it known that we, HARRY A. COVER and ALBERT McKINNEY, citizens of the United States, residing at Mount Vernon, in the county of Jefferson and State of Illinois, have invented certain new and useful Improvements in a Brake Device, of which the following is a specification.

This invention relates to brake devices for tram cars, more particularly to devices of this character employed in mining operations, and has for one of its objects to provide a brake device connected to the track and operative against the sides of the wheels.

Another object of the invention is to provide a brake device operative from the side of the track and against the sides of the car wheels.

With these and other objects in view, the invention consists in certain novel features of construction as hereinafter shown and described and then specifically pointed out in the claim, and in the drawings illustrative of the preferred embodiment of the invention.

Figure 1 is a plan view of a portion of a conventional mine track with the improved brake mechanism applied.

Fig. 2 is a transverse section, enlarged, on the line 2—2 of Fig. 1.

The improved braking mechanism is located alongside the track rails in position to apply lateral pressure against the wheels of the cars about where they engage the rails, and includes in general stationary bearing members or rails attached to the ties and extending in parallel relation thereto, and movable bearing members adapted to be forcibly moved toward and away from the stationary bearing members, the bearing members being located at opposite sides of the track rails and adapted to compress the lower portions of the car wheels between them, and thus apply a braking action thereto.

The stationary bearing members, represented at 10, are preferably in L shape transversely with the horizontal webs bearing upon and bolted or otherwise rigidly attached as at 11 to the ties, represented at 12, and relatively close to the track rails represented at 13.

One line of the members 10 is located at each side of the track preferably externally of the track rails and braced from outward displacement by chock members 14 at suitable intervals, the latter being of wood and rigidly attached to the ties by lag screws or the like and represented at 15.

The confronting faces of the vertical webs of the members 10 are disposed relatively close to the paths of the adjacent side faces of the car wheels, represented at 16, and are inclined outwardly at the ends as shown at 17, to facilitate the passage of the wheel flanges, the entire vertical side of the member 10 being provided with wear plates 17'.

A filler strip 18 is located between the bearing members 10 and the track rails 13 and extends upwardly to the upper face of the ball or tread of the rails to reinforce the track rails and receive the lateral thrust when the braking force is applied, and also to prevent coal, dust, or other matter settling between the rails and the wear plates.

The movable bearing members include shoe strips 19 corresponding in length to and located at the opposite sides of the rails 13 from the members 10, and outturned at the ends as at 20 reversely to and coacting with the outturned ends 17 of the members 10 and with wear plates 17'.

Attached to each of the ties 12 is a support for the shoe strip consisting of a flat base plate 21 and a normally vertical plate 21' hinged at $21^2$ to the base plate 21. Each of the portions 21' is rigidly attached to a longitudinally directed supporting member 22, the latter extending toward each other and provided with outturned ears 23 at their confronting ends.

The plates 22 are rigidly connected as by bolts 24 to the shoe plates 19.

Mounted for rotation in bearings 25 beneath the ties 12, preferably between the rails 13, is an operating shaft 26, having means at one end, such as a crank arm 27, connecting rod 28 and lever 29, to impart oscillatory movement to the shaft.

The lever 29 operates over a toothed segment 30 with which a pawl 31 pivoted at 32 to the lever engages to hold the lever and its attachments in set position, as hereafter explained.

Attached intermediate their ends to the shaft 26 between each pair of the ties 12, are crank plates 33, each plate being coupled at its opposite ends to the inner ends of rods 34 and the rods pivoted respectively at their outer ends as at 36 between the ears 23 of the shoe plates.

Each of the rods 34 is provided with a suitable turnbuckle 37 while the rod 28 is provided with a turn-buckle 38, to enable the rods to be adjusted to take up wear and to control the tension and force applied by the brake shoe members.

The turn-buckles 37 are provided respectively with a locking or jamb nut 39 while the turn-buckle 38 is provided with a similar locking or jamb nut 40, to prevent the loosening of the tension.

The crank arm 27 and the crank plates 33 are rigidly connected to the shaft 26 by keys or other suitable holding devices.

When a car is to be braked, or its motion checked, while passing over the portion of the track with which the improved apparatus is associated, the operator actuating the lever 29 applies force outwardly against the movable member 19 to cause it to bear against the inner face of the wheels, and move them toward the rails 13 and the wear member 17', the latter resisting the outward thrust, and producing the requisite braking action on the wheels. The wear plate 17' receives the major portion of the lateral thrust, and when worn away by the friction, the balls of the rails 13 receive this thrust, and to prevent this lateral strain from being borne wholly by the rails, the chock members 18 are inserted between the rails 13 and the wear plate 17', the latter being supported by the bearing member 10. The chock members engage the wear plates 17' below the line of the upper faces of the rails 13, consequently the portions of the wear plates which are engaged by the chock members are not worn by the friction of the wheels and thus retain their size and effectually resist displacement of the rails when lateral strain is applied thereto in event of the wear of the wear plates.

By forming the shoe plates detachable from the members 19, they can be readily renewed when worn. The improved apparatus is designed for use where an emergency checking of the movements of railway cars is required, more particularly in mine operations, and commonly known as "spragging" or checking the movements of the cars, when required.

With a device thus constructed it will be obvious that a car or cars passing over the track where the braking devices are located can be quickly checked or "braked" by simply actuating the lever 29, and the force of the braking controlled by adjusting the pawl 31 on the teeth of the segment 30.

The braces 14 effectually support the members 10 from lateral displacement under the strains produced by the braking action, while the chock members 18 coact with the members 10 and the braces 14 to effectually support the track rails from lateral displacement from the same cause.

No change whatever of the car is required and its movements can be effectually controlled by an operator from outside and without coming in contact with the car.

The preferred embodiment of the invention is disclosed in the drawings and set forth in the specification, but it will be understood that any modifications within the scope of the claim may be made in the construction without departing from the principle of the invention or sacrificing any of its advantages.

We claim:

An apparatus of the class described comprising stationary bearing members attached to the ties adjacent to the track rails externally thereof, a wear member carried by said stationary bearing member and adapted to receive the lateral thrust of the car wheels, a filler member between the wear member and the outer face of the rail and adapted to receive the outward thrust imparted to the rail, movable bearing members adjacent the track rails internally thereof, means for movably coupling said movable bearing members to the ties, and means for forcibly adjusting said movable bearing members toward the stationary bearing members to engage the wheels of cars passing over the track rails and force them toward the stationary members and toward the rails.

In testimony whereof, we affix our signatures hereto.

HARRY A. COVER.
ALBERT McKINNEY.